(12) United States Patent
Chaganti et al.

(10) Patent No.: US 10,417,431 B2
(45) Date of Patent: Sep. 17, 2019

(54) SECURITY DOMAINS FOR AWARE PLACEMENT OF WORKLOADS WITHIN CONVERGED INFRASTRUCTURE INFORMATION HANDLING SYSTEMS

(71) Applicant: Dell Products L.P., Round Rock, TX (US)

(72) Inventors: Ravikanth Chaganti, Bangalore (IN); Rizwan Ali, Cedar Park, TX (US); Dharmesh M. Patel, Round Rock, TX (US); Yogesh P. Kulkarni, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 251 days.

(21) Appl. No.: 15/454,786

(22) Filed: Mar. 9, 2017

(65) Prior Publication Data

US 2018/0260566 A1    Sep. 13, 2018

(51) Int. Cl.
*G06F 21/57*  (2013.01)
*G06F 9/50*   (2006.01)

(52) U.S. Cl.
CPC .......... *G06F 21/577* (2013.01); *G06F 9/5077* (2013.01)

(58) Field of Classification Search
CPC ...... G06F 21/57; G06F 9/50; G06F 2221/034; G06F 21/577; G06F 9/5077
See application file for complete search history.

(56) References Cited

U.S. PATENT DOCUMENTS

| 2012/0036550 A1* | 2/2012 | Rodriguez | G06F 21/57 726/1 |
| 2014/0157363 A1* | 6/2014 | Banerjee | G06F 9/45558 726/2 |
| 2015/0188944 A1* | 7/2015 | Dyer | H04L 63/20 726/3 |
| 2016/0381072 A1* | 12/2016 | Todd | H04L 63/20 726/1 |

* cited by examiner

*Primary Examiner* — Ali S Abyaneh
*Assistant Examiner* — Alexander R Lapian
(74) *Attorney, Agent, or Firm* — Jackson Walker L.L.P.

(57) ABSTRACT

Disclosed methods and systems discover trust and security information indicative of trust and security capabilities of information handling resources. Based on the trust and security information and a corresponding algorithm, a trust index may be calculated for a particular system. Trust index values may be used to influence subsequent placements of virtual machines, application services, or other objects. Discovery may include invoking resource-specific trust and security discovery adapters to access a resource manifest indicating an interface and trust and discovery artifacts associated with the resource of interest and determine which, if any, of the applicable trust and discovery artifacts are implemented in the applicable system. The trust index may be calculated by determining which trust and security artifacts a particular system includes and, for each such artifact, multiplying a trust assessment assigned to the artifact by a user configurable weighting and summing the resulting products for each artifact.

19 Claims, 9 Drawing Sheets

FIG. 3

```
{
    "Target" : {
        "Server" : {  ⟵ 220
            "BMCIP" : [
 222 ⟵        "172.16.100.5",
                "172.16.100.6",
                "172.16.100.7",
                "172.16.100.8",
                "172.16.100.9",
                "172.16.100.10"
            ],
 224 ⟵  "BMCCredential" : {
                "VaultID" : "BMCCredVault",
                "CredID" : "BMCGenericCredential"
            }
        },
 230 ⟵  "Clusters" : [
            {
                "Type" : "Windows",
                "ID" : "HRCluster01.company.dc",
                "ClusterCredential" : {
                    "VaultID" : "ClusterCredVault",
                    "CredID" : "HRCluster01Credential"
                }
            },
            {
 231 ⟵      "Type" : "Windows",
                "ID" : "FinCluster02.company.dc", ⟵ 232
 233 ⟵      "ClusterCredential" : {
                    "VaultID" : "ClusterCredVault",
                    "CredID" : "FinCluster02Credential"
                }
            }
        ]
    }
}
```

```
                                                  250
                                                 ↙
        {
              "Windows" : {
        260 ⟋ "Cluster" : {
                    "Artifacts" : [ ⟋ 262
                          "Services" : [ ⟋ 270
                      272 ⟋ "HGS",
                                "WindowsFirewall" ⟋ 274
                          ].
              290 ⟍ "Capabilities" : [
                      291 ⟋ "BitLocker",
                                "SecureBoot" ⟍ 292
                          ]
                    ]
                }
            },
            "Firewall" : {
                "Status" : "Enabled",
                "Rules" : [
                    "ICMPv4" : "Disabled",
                    "TCP-Port-80" : "Disabled"
                ]
            }
        }
```

SECURITY DOMAINS FOR AWARE PLACEMENT OF WORKLOADS WITHIN CONVERGED INFRASTRUCTURE INFORMATION HANDLING SYSTEMS

TECHNICAL FIELD

The present disclosure relates in general to management of information handling systems and, more particularly, placing virtual machines, application services, and other workloads within information handling system infrastructure that is trusted and secure.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The importance of information technology (IT), which refers to the use of information handling systems to acquire, access, analyze, generate, and transmit data, especially in the context of a business or other enterprise, has increased dramatically with the proliferation of broadband communication infrastructure, affordable and sophisticated network-aware mobile devices, computerized applications for business and consumers, and oceans of data generated by such applications. Data centers came into existence as enterprises heavily invested in IT quickly recognized the need to create specialized facilities and resources to house and manage information handling systems and related infrastructure and components.

The architecture of early data centers was generally silo-like or vertical, with IT resources implemented in a non-shared landscape for a specific and limited application or objective. Vertically oriented data centers typically resulted in high capital costs, high operating costs, low utilization, poor interoperability, ad hoc management, and one-dimensional security. Horizontal data centers, characterized by the use of at least some degree of virtualization and/or co-located data center facilities, evolved in response to scaling and cost issues inherent in the vertical data center model. While reducing costs and improving utilization, horizontal data centers inherited the fragmented nature of the original data centers, wherein processing resources are acquired separately from storage resources which are acquired separately from networking resources and so forth.

SUMMARY

A disclosed infrastructure services manager includes features for managing information handling systems. Although applicable to all types of information handling system, infrastructure services manager features may be described in the context of converged infrastructure systems, hyper-converged infrastructure systems, hybrid cloud systems, and other types of enterprise-scale information handling systems, all of which may be collectively or generically referred to herein as managed infrastructure systems. Disclosed infrastructure services manager features address various IT objectives including system consolidation, improved utilization of resources, and lower costs. Managed infrastructure systems support these objectives by implementing pools of compute, storage, and networking resources that can be shared by multiple applications and managed in a collective manner using policy-driven processes.

Converged infrastructure systems include information handling systems in which two or more distinct information handling resources are interconnected and validated by a vendor prior to deployment. A non-limiting example of a converged infrastructure system might comprise a modular chassis that include one or more modular compute enclosures, one or more network attached storage devices, and one or more switching resource. Hyper-converged systems include systems in which the virtualization of compute resources and the virtualization of storage resources are integrated into a software defined environment. Hyper-converged systems may be implemented as a group of off-the-shelf rack servers, each of which includes processing resources and direct attached storage resources.

Whether implemented in an enterprise's on premises data center or, increasingly, a third party data center for providing outsourced, co-located, and/or cloud-based IT resources to an enterprise, managed infrastructure systems facilitate consolidation of IT resources and simplify IT management while facilitating improvements in utilization and cost reductions. However, the introduction of readily available, managed infrastructure systems has occurred comparatively recently. Accordingly, resources and techniques for managing the building, deployment, and operation of managed infrastructure systems are yet to be fully implemented and optimized.

Subject matter disclosed in this and other applications address numerous challenges associated with ensuring that: (a) managed infrastructure systems are properly built before being deployed, (b) properly-built managed infrastructure systems are properly deployed, and (c) properly-deployed managed infrastructure systems remain operational and continue to deliver an expected level of performance.

In accordance with subject matter disclosed herein, a method and system in accordance with the present teachings discover trust and security information indicative of trust and security capabilities of information handling resources in a platform comprising one or more information handling systems. Based on the trust and security information and a trust and security algorithm, a trust and security value, referred to herein as a trust index, is calculated for each applicable information handling system. The trust index values may then be used to influence subsequent placements of one or more virtual machines, application services, or other suitable workload objects.

The discovery of trust and security information may be implemented with a discovery adapter model in which one or more resource-specific trust and security discovery adapters are invoked. Each such trust and security discovery adapter may be configured to access a resource manifest indicating an interface, such as an IP address and access credentials, and a list of at least some trust & discovery artifacts associated with the resource of interest. The trust and security discovery adapters may be configured to determine which, if any, of the applicable trust and discovery artifacts are implemented in the applicable system.

The trust index may be determined in accordance with a trust index algorithm. Embodiments of a trust index algorithm may calculate or otherwise determine a trust index value by determining which, if any, trust and security features, capabilities, services or other artifacts are implemented within a particular system and, for each such artifact, obtaining a trust assessment assigned to the artifact and multiplying the trust assessment by a user-configurable weighting. All such assessment-weighting products may be summed to obtain the system's trust index.

Embodiments may employ multiple trust and security discover adapters, with each trust and security discovery adapter corresponding to the trust and security features within in a particular group of system resources. In at least one embodiment, trust and security discovery adapters include adapters corresponding to different architectural layers, including as non-limiting examples a bare-metal layer, one or more firmware/BIOS/driver layers, a hypervisor layer, an operating system layer, an application service layer, one or more virtualization and/or containerization layers, and an infrastructure management layer.

In some embodiments, the OS-level trust and security discovery adapter may be configured to discovery trust and security artifacts including a trusted platform module (TPM) artifact indicative of whether the system employs a TPM, a secure boot artifact indicative of whether the system employs a secure boot service, a host guardian service artifact indicative of whether the system employs such a service, and so forth.

Embodiments may expose the trust and security artifact awareness, including the trust index, resulting from the trust and security discovery process to a system management resource such as an infrastructure services manager to enable trust and security aware placement of objects including application services and virtual machines. In such embodiments, various aspects of the trust and security awareness may be exposed to an administrator or other user via artifact-specific configuration settings included in one or more user interfaces supported by the applicable infrastructure services manager.

Non-limiting examples of artifact-specific configuration enabled by the disclosed teaching include security compliance parameters such as a shielded placement parameter that enables an administrator to specify or request placement on resources that have no incoming interface and/or outgoing interface with the Internet, resources running a host guardian service, resources provisioned with trusted platform modules, and resources that access self-encrypted drive (SED) storage. In addition, embodiments may further include or support trust and security aware placement in accordance with one or more data compliance parameters enabling placement on resources that comply with one or more data compliance regulation and geo location parameters that address geo location requirements and/or preferences, whether for compliance with regulatory provisions or other reasons.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates a trust and security domain manifest;

FIG. 4 illustrates an example trust and security discovery adapter definition;

DETAILED DESCRIPTION

Figure 1A:
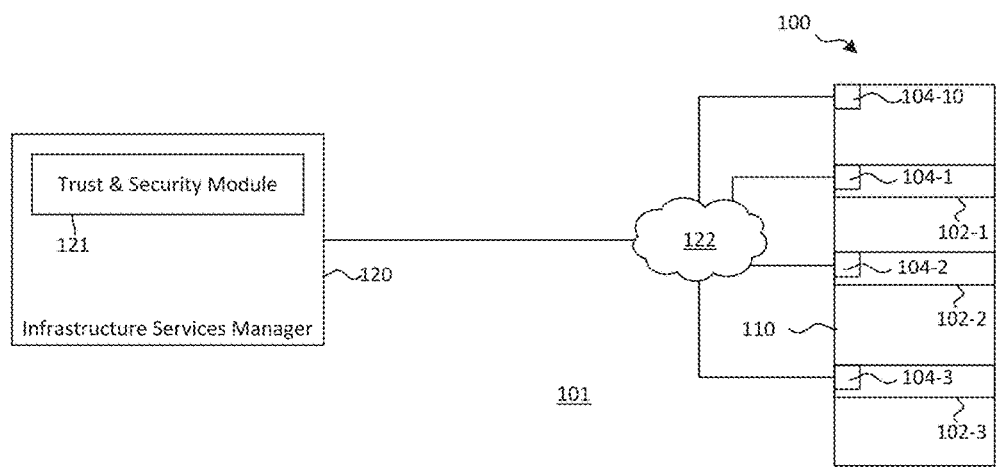
FIG. 1A illustrates a block diagram of a managed infrastructure platform including an infrastructure services manager with a trust and security module in accordance with subject matter described herein.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, the terms "wireless transmissions" and "wireless communication" may be used to refer to all types of electromagnetic communications which do not require a wire, cable, or other types of conduits. Examples of wireless transmissions which may be used include, but are not limited to, short-range wireless communication technologies (e.g., proximity card, Radio-Frequency Identification (RFID), Near Field Communication (NFC), Bluetooth, ISO 14443, ISO 15693, or other suitable standard), personal area networks (PAN) (e.g., Bluetooth), local area networks (LAN), wide area networks (WAN), narrowband personal communications services (PCS), mobile telephony technologies, broadband PCS, circuit-switched cellular, cellular digital packet data (CDPD), radio frequencies, such as the 800 MHz, 900 MHz, 1.9 GHz and 2.4 GHz bands, infra-red and laser.

Turning now to the drawings, FIG. 1A illustrates a managed infrastructure platform 101 in which a managed infrastructure system 100 is illustrated coupled to an infrastructure services manager 120. The managed infrastructure system 100 illustrated in FIG. 1A includes a plurality of information handling resources 102-1, 102-2, and 102-3 included within a rack, chassis, enclosure, or other type of structural support 110 that information handling resources 102 may share in common.

In converged infrastructure system embodiments of managed infrastructure system 100, information handling resources 102-1, 102-2, and 102-3 may each correspond to different types of information handling resources, provide different functions, and originate from different manufacturers. These disparate and heterogeneous information handling resources may be pre-configured with a validated infrastructure by a supplier or vendor. In converged infrastructure system embodiments, managed infrastructure system 100 may be referred to herein as converged infrastructure system 100.

In hyper-converged system embodiments of managed infrastructure system 100, information handling resources 102-1, 102-2, and 102-3 may represent different instances of a rack server or another off-the-shelf compute component, each of which includes compute resources and direct attached storage. These similar and homogenous information handling resources may be pre-configured with a validated infrastructure by a supplier or vendor. In hyper-converged system embodiments, managed infrastructure system 100 may be referred to herein as hyper-converged system 100. In addition, converged infrastructure system embodiments and hyper-converged system embodiments of managed infrastructure system 100 may be collectively or generically referred to herein as managed infrastructure systems 100.

Although FIG. 1A illustrates a managed infrastructure system 100 with three information handling resources 102, it will be readily appreciated that, whether implemented as a converged infrastructure system, a hyper-converged system, or another type of system, managed infrastructure system 100 may include multiple instances of information handling resources 102-1, 102-2, and/or 102-3, as well as additional types of information handling resources not depicted in FIG. 1A.

Whether implemented as a converged infrastructure system, a hyper-converged system or another type of system, the infrastructure of managed infrastructure system 100 may include, in addition to the physical hardware components, any and all software and/or firmware components, including BIOS firmware, operating system software, hypervisor software, and/or containerization software, as well as any management resources on any one or more of the information handling resources 102.

FIG. 1A further illustrates a management resource 104 corresponding to each information handling resource 102, as well as a management resource 104-10 associated with structural support 110. Management resources 104, which may correspond to remote access controllers, baseboard management controllers, or the like, are illustrated coupled to a remote and centralized infrastructure services manager 120 via management network 122, which may include and/or support one or more out-of-band connections between management resources 104 and infrastructure services manager 120.

For embodiments of managed infrastructure system 100 that support virtualized, containerized, or other types of abstracted information handling resources, infrastructure services manager 120 may include or encompass resources for managing such abstracted resources. These resources may include, as examples, infrastructure manager resources, virtual machine resources, or microservice/container clustering and/or orchestration frameworks, depending upon the implementation. Infrastructure services manager 120 may include or support functionality found in any of various publically available management resources, including as non-limiting examples, Dell Active System Manager system management resources from Dell, Inc., a vCenter server and/or VMware/vSphere management resources from VMware, a subsidiary of Dell Technologies, Virtual Machine Manager (VMM)/System Center 2102 resources from Microsoft, Apache Mesos cluster management resources from the Apache Software Foundation, Kubernetes container management/orchestration resources from the Cloud Native Computing Foundation, Docker Swarm container clustering resources from Docker, Inc., and vRealize cloud automation resources from VMware/Dell Technologies.

The infrastructure services manager 120 may be configured to interact with one or more management services that may provide infrastructure services manager 120 with information or services that improve the ability of infrastructure services manager 120 to manage managed infrastructure system 100.

The infrastructure services manager 120 of FIG. 1A includes a trust and security module 121. In at least one embodiment, trust and security module 121 configured to dynamically discover and rank trust and security domains within managed infrastructure system 100. The trust and security module is described in greater detail below in FIG. 2 and the subsequent figures.

Figure 1B:
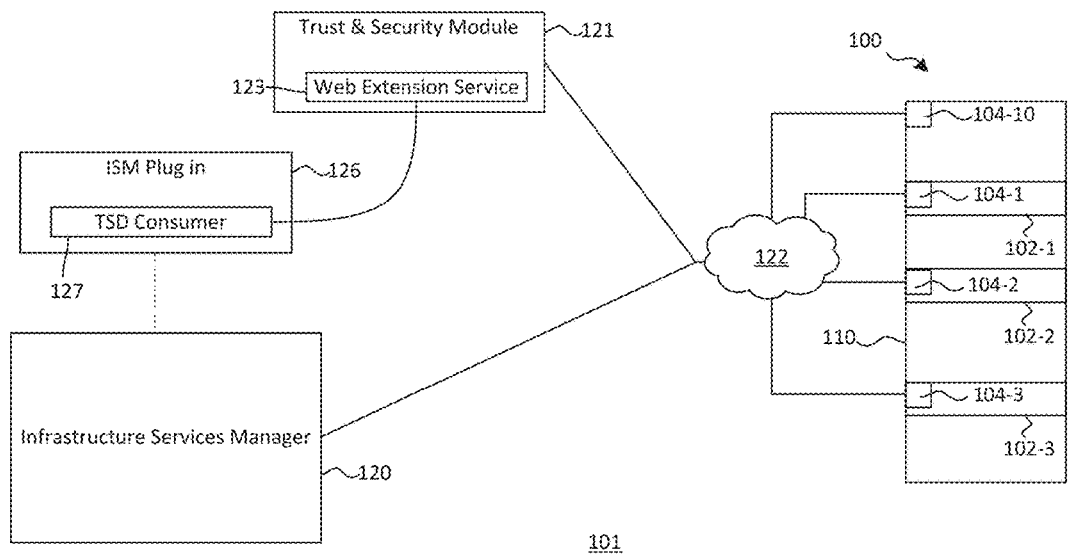
FIG. 1B illustrates an alternative embodiment of the managed infrastructure platform in which an external trust and security module communicates trust and security information to a trust and security consumer of an infrastructure services manager plugin.

FIG. 1B illustrates an alternative embodiment of the managed infrastructure platform 101 in which trust and security module 121 is external to infrastructure services manager 120. As illustrated in FIG. 1B, trust and security module 121 includes a web extension service 123 configured to communicate with a trust and security domain consumer 127 of an infrastructure services manager 126.

Figure 2:
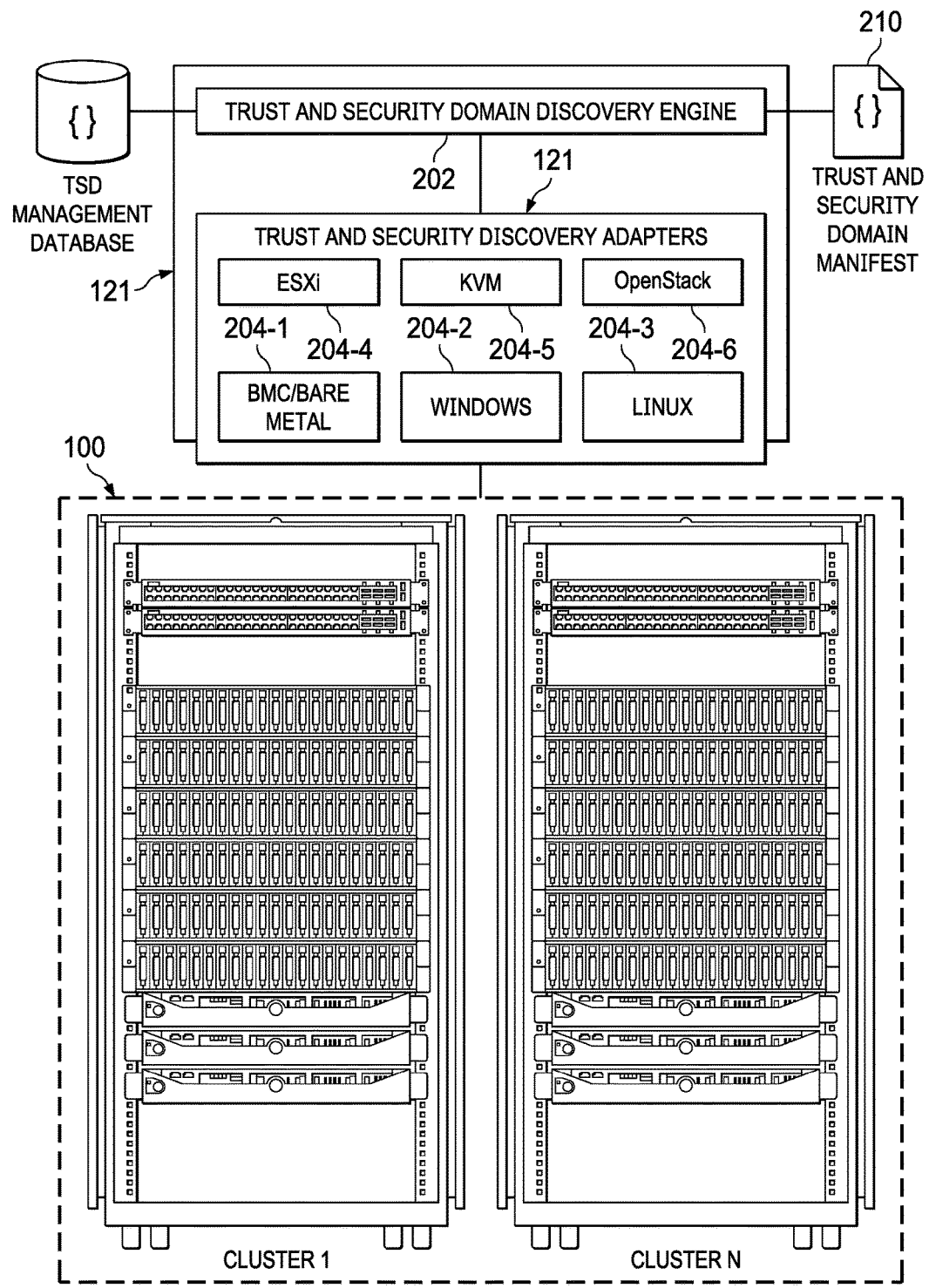
FIG. 2 illustrates a block diagram of trust and security module including a trust and security discovery engine.

Referring now to FIG. 2, a block diagram illustrates elements of a trust and security module 121. For the sake of clarity in the drawing, trust and security module 121 is illustrated as being coupled to managed infrastructure system 100 without further illustrating elements that enable or facilitate such coupling. Those of skill will appreciate that the trust and security module 121 illustrated in FIG. 2 may be coupled to managed infrastructure system 100 as shown in FIG. 1A, as shown in FIG. 1B, or in any other suitable manner.

The trust and security module 121 of FIG. 2 includes a trust and security discovery engine 202 coupled to one or more trust and security discovery adapters 204. Trust and security discovery adapters 204 include discovery adapters configured to determine trust and security features, services, and/or capabilities at all levels of the system architecture, including trust and security discovery adapters for bare metal/BMC trust and security features, BIOS/firmware trust and security features, operating system trust and security features, hypervisor trust and security features, and infrastructure services manager features.

The trust and security discovery adapters 204 illustrated in FIG. 2 include a bare metal/BMC trust and security discovery adapter 204-1, operating system trust and security discovery adapters including a Windows trust and security discovery adapter 204-2 and a Linux trust and security discovery adapter 204-3, hypervisor trust and security discovery adapters including an ESXi trust and security discovery adapter 204-4, a KVM trust and security discovery adapter 204-5, and an OpenStack trust and security discovery adapter 204-6.

The trust and security domain discover engine 202 receives input from a trust and security domain manifest 210, an example of which is illustrated in FIG. 3. The trust and security domain manifest 210 illustrated in FIG. 3 includes information describing the trust and security resources, capabilities, and/or services of an information handling resource 211. The trust and security domain manifest 210 illustrated in FIG. 2 is implemented with a JSON format, but other embodiments may describe trust and security features using a different structured data protocol or via a JSON document that uses more, fewer, or a different security and trust attributes.

The trust and security domain manifest 210 illustrated in FIG. 3 describes trust and security elements of Target1 via a server attribute 220 and a clusters attribute 230. The server attribute 220 illustrated in FIG. 3 includes a BMCIP attribute 222 and a BMCCredentials attribute 224 that identify network addresses and access credentials for one or management endpoints. Each of one or more clusters described under cluster attribute 230 includes a type attribute 231, an ID attribute 232, and a cluster credential attribute 233.

A trust and security discovery adapter 204 may access an applicable trust and security domain manifest 210 as part of a discovery process. As suggested previously, trust and security features may be implemented at any number of layers of the system architecture from a bare metal/hardware layer to a layer overlaying the host operating system. In at least one embodiment, a trust and security discovery adapter 204 is implemented for each system layer of interest, i.e., each layer of a system that may include trust and security features.

Each trust and security discovery adapter 204 may be implemented as a representational state transfer (REST) compliant (RESTful) resource that supports one or more RESTful operations including, as a primary example, a GET request that retrieves information from the applicable interface on the applicable resource.

FIG. 4 illustrates an example trust and security adapter definition document 250, which enumerates the trust and security features that the discovery engine is enabled to discover for a particular resource or system architecture level. Trust and security adapter definition document 250 may be included within or accessible to a corresponding trust and security discovery adapter 204. The particular example illustrated in FIG. 4 is a trust and security discovery adapter definition document for a Windows Cluster resource.

The trust and security adapter definition document 250 of FIG. 4 includes a cluster parameter 260 that identifies an artifacts attribute 262 that encompasses a services attribute 270 and a capabilities attribute 290. The adapter definition document 250 illustrated in FIG. 4 lists a home guardian service value 272 and a Windows Firewall value 274 as possible values for the services attribute 270. The capabilities attribute 290 of FIG. 4 identifies Bit locker 291 and Secure Boot 292 as possible values.

Again, while the trust and security discovery adapter 204-2 represented in FIG. 4 conveys OS-level trust and security capabilities and services. Other trust and security discovery adapters 204 may convey trust and security capabilities and services implemented at other architectural levels. FIG. 2 illustrates a particular group of trust and security discovery adapters 204, but other embodiments may include more, fewer, and/or different adapters than those shown in FIG. 2.

In at least one embodiment, trust and security module 121 implements the trust and security discovery adapters 204 to recognize and detect a variety of known trust and security features, resources, and capabilities. The trust and security module 121 may implement, include, or support one or more algorithms for valuing a system's overall security worthiness. Any such algorithm may be supported by user-configurable weightings enabling administrators to vary and/or concentrate the emphasis of the servicer values. Based on the algorithm selected, the attributes that the selected algorithm takes as an input, which trust and security features are implemented, any applicable weightings of the various attributes, trust and security module 121 may generate a Trust Index value for a particular cluster or other defined group of resources. An example algorithm for calculating or otherwise determining a trust index may be of the form:

$$CTi = fn\{(Ec1*Iw1) + \ldots + (Ec\ m*Iw\ m)\}$$

wherein Ec represents an empirical trust value assigned to a particular feature and Iw identifies the user configurable weighting.

Again, the trust and security discovery supported by trust and security discovery engine 121 encompasses trust and security resources implemented at the lowest, bare metal/hardware level, to the host operating system and applications running on the host OS.

Figure 5:
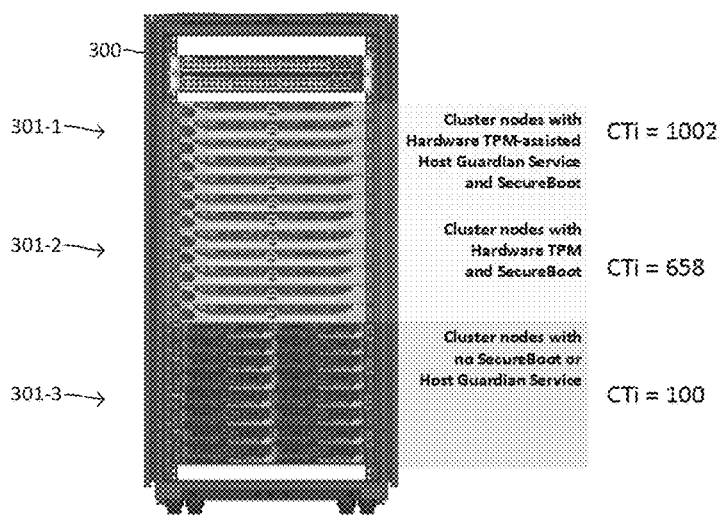
FIG. 5 illustrates the use of a security index as a quantitative indicator of the security associated with different infrastructure resources.

FIG. 5 illustrates the trust index described above with an illustration of a rack 300 that includes cluster nodes 301 of three different configurations, 301-1, 301-2, and 301-3. The first cluster node configuration 301-1 corresponds to cluster nodes that include, by way of example, a hardware trusted platform module (TPM)-assisted HGS service and a SecureBoot service. The second cluster configuration 301-2 includes cluster nodes with Hardware TPM and SecureBoot, but no HGS, while third cluster 301-3 represents nodes that have no SecureBoot or HGS service. Assigning particular values to each of the trust and security features and assigning a uniform weighting or another suitable weighting, FIG. 5 illustrates example trust index values for each of the three types of cluster nodes. In at least one embodiment, the trust and security module 121 calculates or otherwise generates trust index values and exposes, distributes, stores, or otherwise makes the trust index values to, them to an infrastructure services manager 120 or any other information handling resource that might be suitable for making trust-aware placement decisions.

Figure 6:
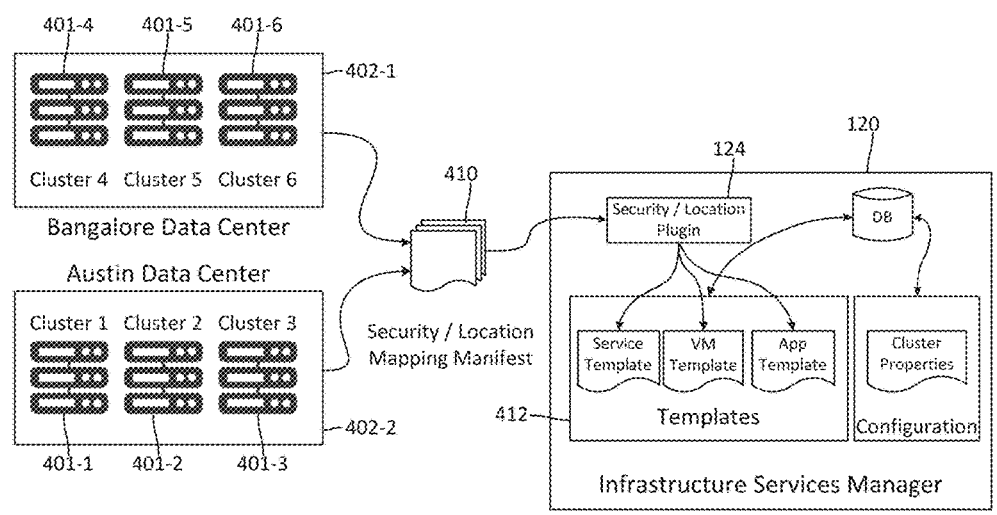
FIG. 6 illustrates a mapping of security location information to a plugin of an infrastructure services manager for inclusion in one or more service templates.

FIG. 6 illustrates a trust and security feature in which clusters 401 from one or more datacenters 402, any two or more of which may represent geographically diverse datacenters separated by a distance exceeding some particular threshold, are discovered and evaluated for their trust and security capabilities as described above. Such an evaluation may include, in at least some embodiments, the calculation of a trust index, as described above, for each cluster 401 according to a particular weighting chosen by an administrator, implemented by a policy, or otherwise selected.

FIG. 6 is suitable for adding security and location awareness to infrastructure services manager 120, extending application, virtual machine, and service templates to account for different levels of security during deployment, define tier-based security requirements when deploying multi-tiered applications, and define virtual machine or application placement destination based on security, data compliance requirements or geography.

As depicted in FIG. 6, a security/location manifest 410 is configured to convey the security features, including trust index values, and locations of each cluster 401 to infrastructure services manager 120. The infrastructure services manager 120 of FIG. 6 includes a security location plugin 124 that enables infrastructure services manager 120 to consume the security/location information and provide trust and security information to service templates. Security location plugin 124 may be configured to read the security/location mapping manifest 410 and extend/update the cluster properties with that information. In addition, any one or more of the templates 412 may be updated to reflect the security and geolocation capabilities of the infrastructure being managed.

Using the security/location intelligence provided via mapping manifest 410, the infrastructure services manager 120 may be made aware of security domains and security capabilities between different clusters that it manages. An extension may add security related properties to service/application deployment templates 412, examples of which may include Dell Active System Manager service templates, VMware vRealize Service blueprints, and System Center VMM service templates. During a deployment of an application or a virtual machine, the applicable template 412 will have one or more attributes imposing security compliance requirements or constraints. Examples of security compliance deployment requirements may include requirements for deploying in a physically isolated infrastructure, deploying in certain regions to meet data compliance requirements, deploying as a shielded virtual machine, deploying in an Internet-inaccessible environment.

Figure 7:
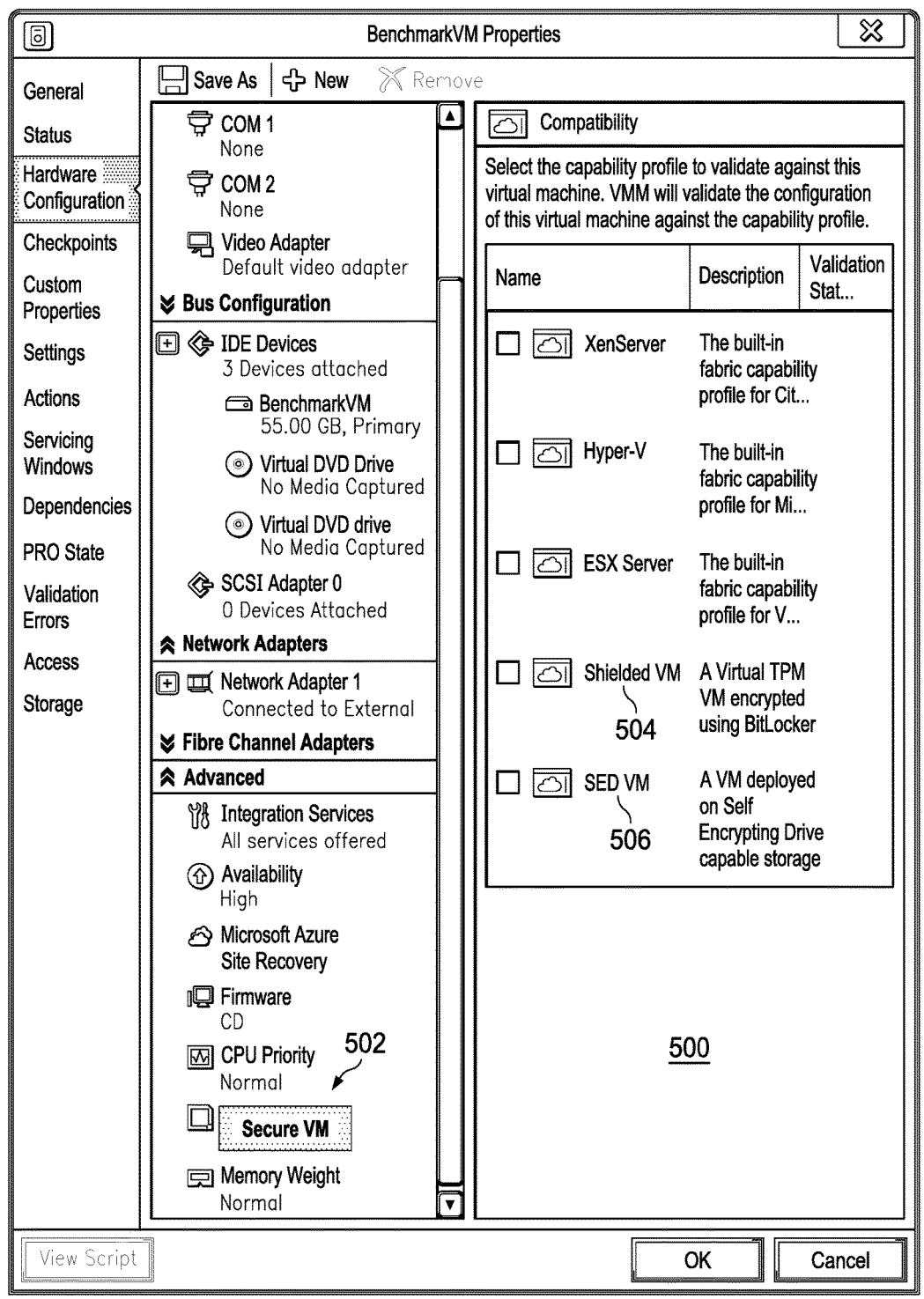
FIG. 7 illustrates a management interface including a secure virtual machine setting and corresponding attributes.

FIG. 7 illustrates a feature in which one or more security compliance attributes are included in a settings interface 500 or similar interface of infrastructure services manager 120. The illustrated interface 500 includes a secure VM option 502 that is configured to expose a shielded virtual machine attribute 504 and a secure encrypted virtual machine attribute 506 to the administrator or other user. In at least one embodiment, selecting the shielded virtual machine attribute 504 ensures that the applicable virtual machine is deployed on a server/virtual cluster that has been identified, by a trust and security module 121 (not depicted in FIG. 7, see FIG. 2), as a resource that is running a Host Guardian Service and has BitLocker and TPM capabilities in the hardware. Similarly, selecting secure encrypted virtual machine attribute 506 ensures that the virtual machine's virtual disks and any associated data disks are placed on infrastructure where the storage consists of Self Encrypted Drives (SED).

Figure 8:
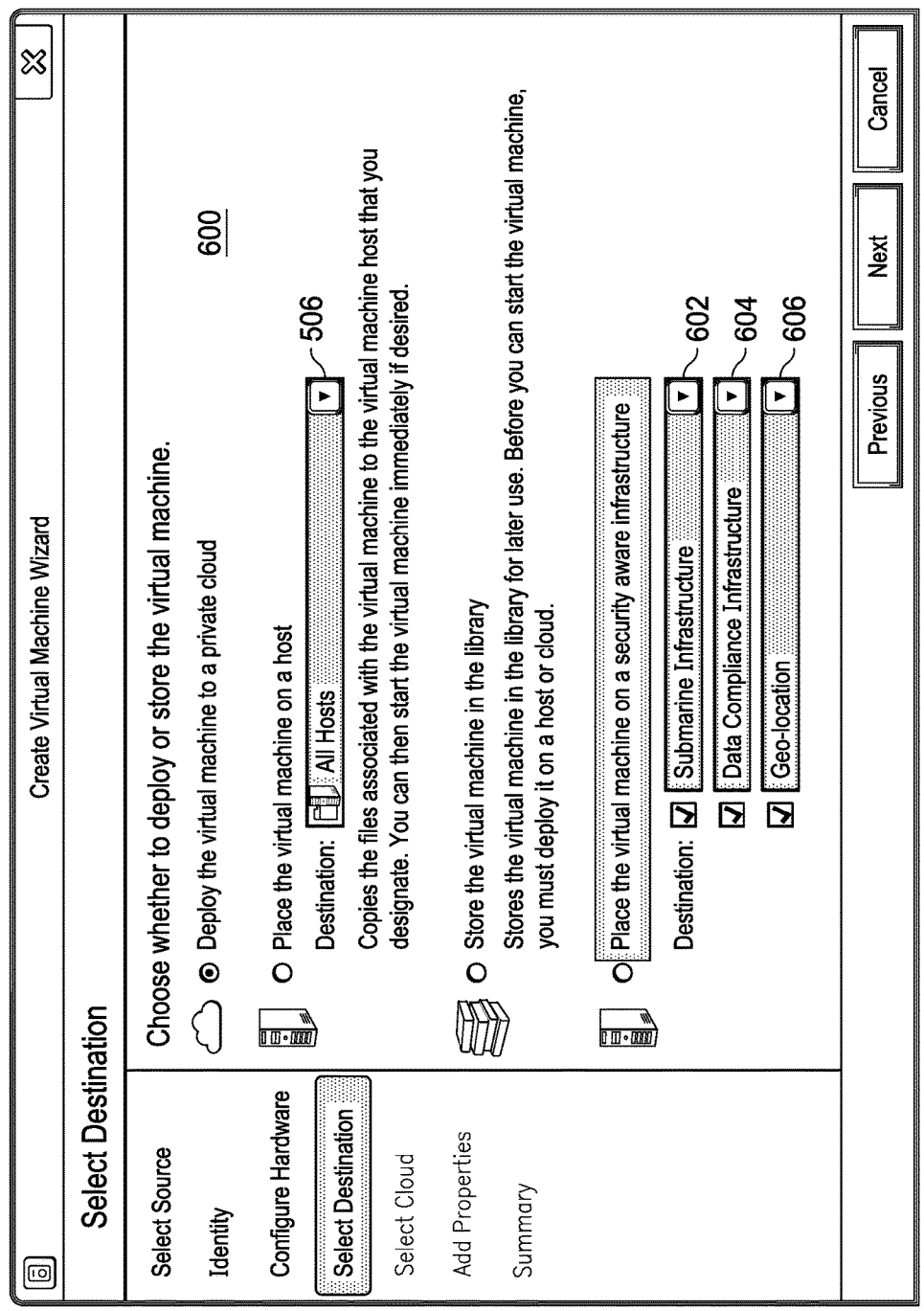
FIG. 8 illustrates a management interface enabling placement on security aware infrastructure.

FIG. 8 illustrates a feature enabling an administrator to place resources in accordance with security, data compliance requirements and/or geographic requirements or constraints. FIG. 8 illustrates an interface 600 that, in conjunction with trust and security module 121, supports a submarine infrastructure feature 602 for specifying placement on an infrastructure that has no outgoing internet connectivity. In at least one embodiment, infrastructure services manager 120 shows all applicable clusters/servers with this capability. The interface 600 of FIG. 8 further includes a feature for specifying a data compliance data compliance infrastructure 604 that illustrates all clusters, infrastructures that comply with either a particular regulation or standard including, as non-limiting examples, PCI DSS (Payment Card Industry Data Security Standard), HIPAA (Health Insurance Portability and Accountability Act), and Sarbanes-Oxley.

The interface 600 illustrated in FIG. 8 further includes a geo-location configuration setting 606 configured to list infrastructure available in different geo locations, enabling the administrator or other user to select the most appropriate location to ensure compliance with any local, regional, or national laws or regulations constraining data storage locations.

Figure 9:
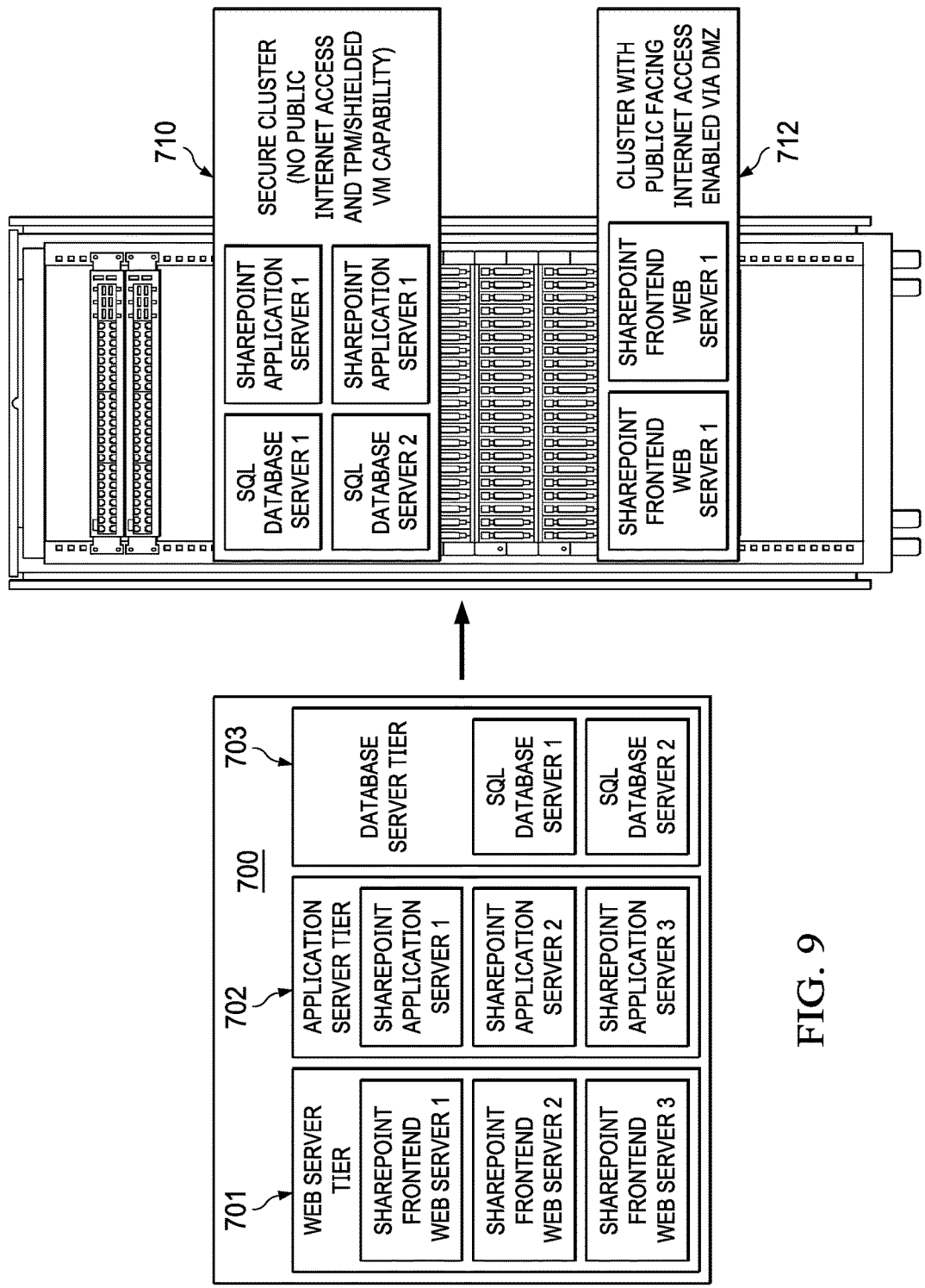
FIG. 9 illustrates mapping of different tiers of a multi-tier application service to infrastructure having different security characteristics.
Figure 10:
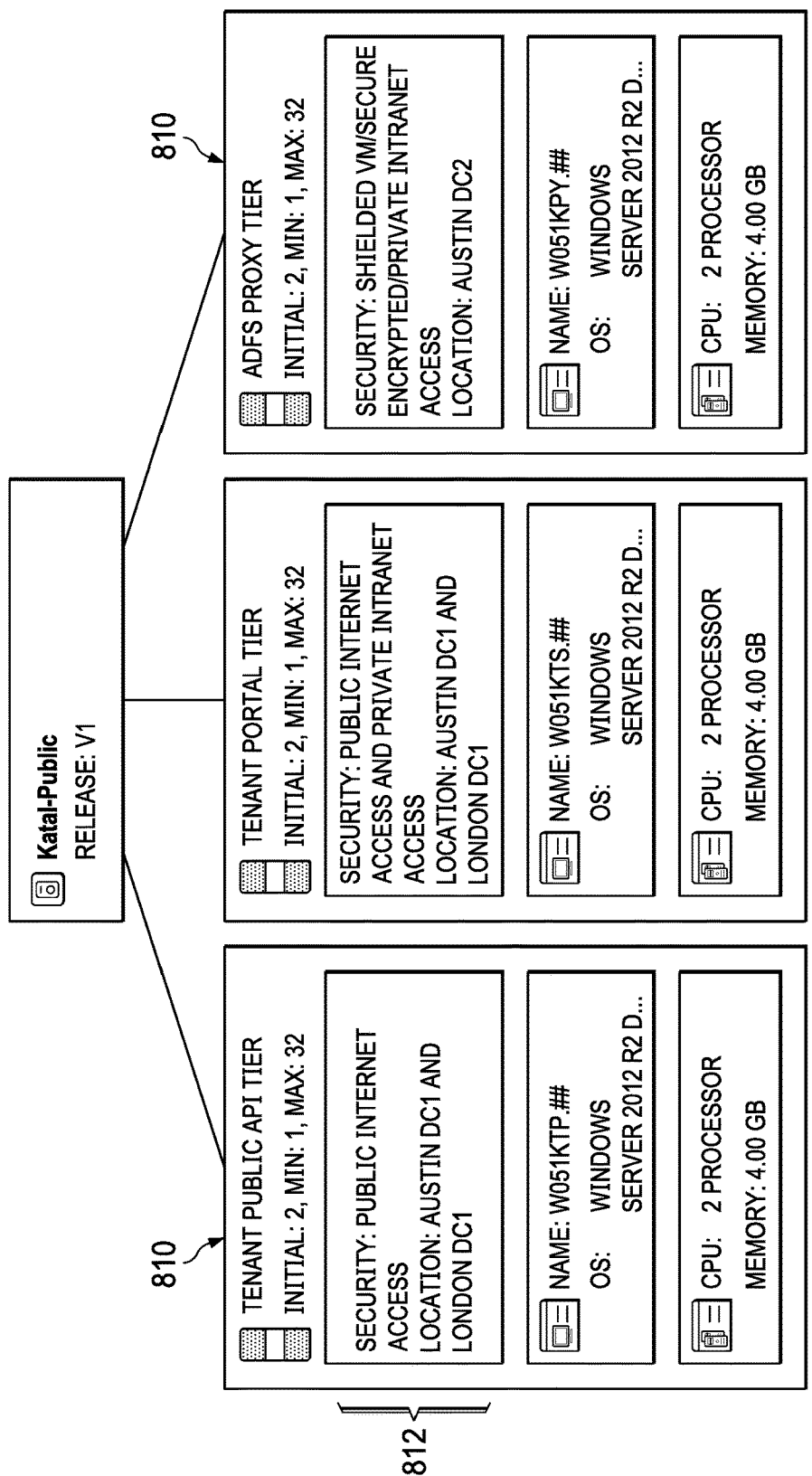
FIG. 10 illustrates the inclusion of security awareness into service templates.

FIG. 9 illustrates a security based mapping of tiers in a multi-tier application service. In the illustrated example, a multi-tier application service 700 includes a web server tier 701, an applications tier 702, and a database server tier 703. The infrastructure includes clusters 710 that have no internet access and include TPM/shielded VM capability. The infrastructure further includes clusters 712 with public facing internet access enabled via a DMZ. FIG. 9 further conveys the mapping of instances of the front end web server and the database server to the secure cluster 710 and instances of the frontend web server to the cluster 712 with public facing internet access. FIG. 10 illustrates the incorporation of security and location attributes 812 into application service templates 810.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A method, comprising:
    discovering trust and security information indicative of trust and security capabilities of information handling resources in a platform comprising one or more information handling systems;
    calculating, based on the trust and security information and a trust and security algorithm, a trust and security value for each of the one or more information handling systems; and
    placing one or more workload objects within the platform in accordance with the trust and security value of each of the one or more information handling systems;
    wherein discovering the trust and security information includes invoking one or more trust and security discovery adapters configured to:
    access a trust and security domain manifest indicative of trust and discovery artifacts associated with a resource; and
    determine which of the trust and discovery artifacts are implemented in the resource;
    wherein invoking one or more trust and security discovery adapters includes invoking a trust and security discovery adapter for each of a plurality of architectural layers associated with the resource, wherein the plurality of architectural layers includes:
    a bare metal layer;
    a firmware layer;
    an operating system layer; and
    a hypervisor layer.

2. The method of claim 1, wherein the plurality of architectural layers includes an infrastructure services manager layer.

3. The method of claim 2, further comprising:
    for each artifact implemented in the resource:
        obtain a trust index and a user configurable weighting; and
        add the product of the trust index and the user configurable weighting to a total.

4. The method of claim 3, wherein the one or more trust and security adapters include an operating system adapter and wherein the artifacts for the operating system adapter include a trusted platform module, a secure boot service, and a host guardian service.

5. The method of claim 1, further comprising:
    receiving administrator input indicative of one or more security compliance parameters, wherein said placing includes placing in virtual machines within the platform in compliance with the security compliance parameters.

6. The method of claim 5, wherein the security compliance parameters include:
    a shielded parameter for indicating placement on a server or virtual cluster running host guard service, and trusted platform modules; and
    a secure encrypted parameter for indicating placement of virtual disks on self-encrypted drive storage devices.

7. The method of claim 5, wherein the security compliance parameters include:
    a submarine infrastructure parameter enabling placement on a server or virtual cluster without outgoing internet connectivity;
    a data compliance parameter enabling placement on resources that comply with one or more data compliance regulations; and
    a geo location parameter indicative of resources in different regions.

8. An information handling system, comprising:
    a processor;
    a network interface for communicating with management endpoints of information handling resources in a platform comprising one or more information handling systems;
    a non-transitory computer readable medium including processor executable instructions that, when executed by the processor, cause the processor to perform one or more operations comprising:
    obtaining trust and security information indicative of trust and security capabilities of information handling resources in a platform comprising one or more information handling systems;
    calculating, based on the trust and security information and a trust and security algorithm, a trust and security value for each of the one or more information handling systems; and
    placing one or more workload objects within the platform in accordance with the trust and security value of each of the one or more information handling systems;
    wherein obtaining the trust and security information includes invoking one or more trust and security discovery adapters configured to:
    access a trust and security domain manifest indicative of trust and discovery artifacts associated with a resource; and
    determine which of the trust and discovery artifacts are implemented in the resource;
    wherein invoking one or more trust and security discovery adapters includes invoking a trust and security discovery adapter for each of a plurality of architectural layers associated with the resource, wherein the plurality of architectural layers includes:
    a bare metal layer;
    a firmware layer;
    an operating system layer; and
    a hypervisor layer.

9. The information handling system of claim 8, wherein the operations include:
    for each artifact implemented in the resource:
        obtain a trust index and a weighting; and
        add the product of the trust index and the weighting to a total.

10. The information handling system of claim 9, wherein the one or more trust and security adapters include an operating system adapter and wherein the artifacts for the operating system adapter include a trusted platform module, a secure boot service, and a host guardian service.

11. The information handling system of claim 9, wherein the operations include:
receiving administrator input indicative of one or more security compliance parameters, wherein said placing includes placing in virtual machines within the platform in compliance with the security compliance parameters.

12. The information handling system of claim 11, wherein the security compliance parameters include:
a shielded parameter for indicating placement on a server or virtual cluster running host guard service, and trusted platform modules; and
a secure encrypted parameter for indicating placement of virtual disks on self-encrypted drive storage devices.

13. The information handling system of claim 11, wherein the security compliance parameters include:
a submarine infrastructure parameter enabling placement on a server or virtual cluster without outgoing internet connectivity;
a data compliance parameter enabling placement on resources that comply with one or more data compliance regulations; and
a geo location parameter indicative of resources in different regions.

14. A non-transitory computer readable medium including processor executable instructions that, when executed by a processor, cause the processor to perform one or more operations comprising:
obtaining trust and security information indicative of trust and security capabilities of information handling resources in a platform comprising one or more information handling systems;
calculating, based on the trust and security information and a trust and security algorithm, a trust and security value for each of the one or more information handling systems; and
placing one or more workload objects within the platform in accordance with the trust and security value of each of the one or more information handling systems;
wherein obtaining the trust and security information includes invoking one or more trust and security discovery adapters configured to:
access a trust and security domain manifest indicative of trust and discovery artifacts associated with a resource; and
determine which of the trust and discovery artifacts are implemented in the resource;
wherein invoking one or more trust and security discovery adapters includes invoking a trust and security discovery adapter for each of a plurality of architectural layers associated with the resource, wherein the plurality of architectural layers includes:
a bare metal layer;
a firmware layer;
an operating system layer; and
a hypervisor layer.

15. The non-transitory computer readable medium of claim 14, wherein obtaining the trust and security information includes invoking one or more trust and security discovery adapters configured to:
access a resource manifest indicative of an interface and artifacts associated the resource; and
determine which of the artifacts are implemented in the resource.

16. The non-transitory computer readable medium of claim 15, wherein the operations include:
for each artifact implemented in the resource:
obtain a trust index and a weighting; and
add the product of the trust index and the weighting to a total.

17. The non-transitory computer readable medium of claim 16, wherein the one or more trust and security adapters include an operating system adapter and wherein the artifacts for the operating system adapter include a trusted platform module, a secure boot service, and a host guardian service.

18. The non-transitory computer readable medium of claim 14, wherein the operations include:
receiving administrator input indicative of one or more security compliance parameters, wherein said placing includes placing in virtual machines within the platform in compliance with the security compliance parameters.

19. The non-transitory computer readable medium of claim 18, wherein the security compliance parameters include:
a shielded parameter for indicating placement on a server or virtual cluster running host guard service, and trusted platform modules; and
a secure encrypted parameter for indicating placement of virtual disks on self-encrypted drive storage devices.

* * * * *